(12) United States Patent
Han

(10) Patent No.: US 10,648,324 B2
(45) Date of Patent: May 12, 2020

(54) AUXILIARY SYSTEM FOR USE IN DRILLING

(71) Applicant: Welladv Oil Service Limited, Hong Kong (CN)

(72) Inventor: Weishan Han, Katy, TX (US)

(*) Notice: Subject to any disclaimer, the term of this patent is extended or adjusted under 35 U.S.C. 154(b) by 562 days.

(21) Appl. No.: 15/026,032

(22) PCT Filed: Sep. 30, 2013

(86) PCT No.: PCT/CN2013/084680
§ 371 (c)(1),
(2) Date: Mar. 30, 2016

(87) PCT Pub. No.: WO2015/042934
PCT Pub. Date: Apr. 2, 2015

(65) Prior Publication Data
US 2016/0230544 A1 Aug. 11, 2016

(51) Int. Cl.
*G01V 3/00* (2006.01)
*E21B 47/12* (2012.01)
(Continued)

(52) U.S. Cl.
CPC ............. *E21B 47/122* (2013.01); *E21B 7/06* (2013.01); *E21B 47/02216* (2013.01); *E21B 47/02224* (2013.01); *G01V 3/20* (2013.01)

(58) Field of Classification Search
CPC ... G01V 3/28; G01V 3/38; G01V 3/18; G01V 3/20; G01V 3/22; G01V 3/24; G01V 3/26; G01V 3/30; G01V 3/10; G01V 3/265; G01V 3/02; G01V 3/04; G01V 3/06; G01V 3/104; E21B 47/122; E21B 47/02216; E21B 47/0224; E21B 7/06; G01N 27/223; G01N 33/246; G01R 27/18; G01R 27/20;
(Continued)

(56) References Cited

U.S. PATENT DOCUMENTS 3,579,106 A * 5/1971 Lord ................... H04Q 1/32
324/140 R
6,236,620 B1 5/2001 Schultz et al.
(Continued)

FOREIGN PATENT DOCUMENTS

CN 1657742 A 8/2005
CN 101235716 A 8/2008
(Continued)

OTHER PUBLICATIONS

International Search Report for PCT/CN2013/084680 dated Jul. 9, 2014.

*Primary Examiner* — Thang X Le
(74) *Attorney, Agent, or Firm* — Enshan Hong; VLP Law Group LLP

(57) ABSTRACT

The present invention provides a drilling auxiliary system, which establishes one or more links among multiple wells or among different branches of the same well. When the present invention is applied to the EM data transmission, it can significantly reduce unwanted electric energy consumption in the formation, thus effectively improve data transmission efficiency. When the present invention is applied to the casing detection, it can achieve a large detection range and greatly simplify the complexity of the operation, thereby saving costs.

11 Claims, 16 Drawing Sheets

(51) Int. Cl.
  *E21B 7/06* (2006.01)
  *E21B 47/022* (2012.01)
  *G01V 3/20* (2006.01)

(58) Field of Classification Search
  CPC ............ G01R 31/2621; G01R 31/2623; G01R
   31/275; G01R 31/2884; G01R 31/2608;
   G01R 31/2614; G01R 31/2607; G01R
   31/31924; G01R 31/3004; G01R
   31/31922; G01R 31/318511; G01R
   31/2831; G01R 31/318505
  See application file for complete search history.

(56) References Cited

U.S. PATENT DOCUMENTS

| | | | | |
|---|---|---|---|---|
| 6,636,046 | B2 * | 10/2003 | Lee | G01R 27/08 |
| | | | | 324/347 |
| 9,890,629 | B2 * | 2/2018 | Clark | E21B 47/02216 |
| 10,429,534 | B2 * | 10/2019 | Donderici | E21B 47/02216 |
| 2001/0013412 | A1 * | 8/2001 | Tubel | E21B 34/066 |
| | | | | 166/250.01 |
| 2002/0084913 | A1 * | 7/2002 | Hudson | E21B 47/121 |
| | | | | 340/853.1 |
| 2009/0178850 | A1 * | 7/2009 | Waters | E21B 7/04 |
| | | | | 175/45 |
| 2011/0298462 | A1 * | 12/2011 | Clark | E21B 47/024 |
| | | | | 324/346 |
| 2011/0308789 | A1 * | 12/2011 | Zhang | G01V 3/28 |
| | | | | 166/250.01 |
| 2011/0308859 | A1 * | 12/2011 | Bittar | E21B 47/022 |
| | | | | 175/45 |
| 2011/0309836 | A1 * | 12/2011 | Bittar | G01V 3/26 |
| | | | | 324/339 |
| 2016/0273337 | A1 * | 9/2016 | Donderici | E21B 47/02216 |

FOREIGN PATENT DOCUMENTS

| | | |
|---|---|---|
| CN | 101731286 A | 6/2010 |
| CN | 101737009 A | 6/2010 |

* cited by examiner

AUXILIARY SYSTEM FOR USE IN DRILLING

CROSS-REFERENCE TO RELATED APPLICATIONS

This application is a national stage application (under 35 U.S.C. § 371) of PCT/CN2013/084680, filed Sep. 30, 2013, which is incorporated herein by reference in its entirety.

FIELD OF THE INVENTION

The invention relates to the technical field of drilling, and particularly, to a drilling auxiliary system.

BACKGROUND OF THE INVENTION

Logging While Drilling (LWD) in oil and gas exploration refers to the technologies to constantly measure geophysical information around borehole in the process of drilling, and to real-time transmit the logging data back to the surface. One of the key technologies of LWD is the real-time signal transmission. Currently, mud-pulse telemetry system is widely applied, in which the signals are sent to the surface with the help of pulses transmitted through the drilling mud. The mud-pulse telemetry system is used in a wide range of drilling wells, but with a fairly low data transmission rate, usually less than 8 bit per second. Electromagnetic (EM) telemetry technology was developed to improve the transmission rate, which sends signals from the down hole to the surface through EM waves. A short insulation section is installed between the non-magnetic drill collar and the upper drill pipe, and a low frequency alternative current is applied on both ends of the insulation section to generate the EM field. This EM filed contains the logging information, and will be achieved by measuring the voltage between the surface pipe and an electrode, which is set on a remote ground surface. FIG. 1 shows a typical EM telemetry system of a prior art. An insulating ring 2 is set on the drill pipe 5 (on the top of the drill bit 4) to divide the drill pipe into two mutually insulated segments. Power source 3 loads a low-frequency current to both ends of the insulating ring. As the arrows in the figure indicate, the formation (refers to the formation from the vicinity of both ends of the insulating ring 2 to infinity) and the power source form a current loop. In the FIG. 1, the arrowed lines indicate the current distribution in the formation at a certain moment. Wherein, thick lines indicate strong current intensity, thin lines imply weak current intensity, and dotted lines stands for very small current intensity. The currents in the different part of formation change both value and direction with respect to time, but the ratios among the current intensity are substantially constant. As shown in FIG. 1, there is relatively larger current intensity in the sub-loop near the insulating ring 2, and much weaker current intensity in the sub-loop far from the insulating ring 2. And when the well is deep (such as a well 2000 meters long), the current in the sub-loop through the vicinity of surface will be very weak. The LWD data is loaded on the power source, and will be transmitted to the surface through the electromagnetic field generated by the currents. A signal receiver 10 is connected between the terminal A (surface part of casing 1 of the drilling well) and a far ground terminal B. Thus, the downhole data can be acquired by measuring the voltage between terminal A and B using the signal receiver 10. However, because the EM signal strength near the ground surface is very small, the signal receiver 10 is required of an extremely high sensitivity, and the data transmission rate is also quite limited.

As one of wild applied technologies of LWD, Case ranging is the process to locate the downhole casings of the nearby existing wells during the drilling process. There are two relatively mature techniques in case ranging. One is to put a transmission line (or a transmitter) into the wells to be located, and place a receiver on the pipe of the drilling well. The transmission line (or transmitter) generates an EM field (or static magnetic field) in the formation, which is measured by the receiver, and is used to determine the location of the already existing well. This method has a long detection distance, but it requires complicated operations and is expensive. The other technique is to place the transmitter and the receiver both on the pipe of the drilling well. The transmitter excites an EM field in the formation, which will generates an induced current in the casing of the already existing wells. The induced current produces a secondary EM field in the formation, which is detected by the receiving device. The secondary EM filed will be used to determine the locations of the already existing wells. This method is relatively simple, but its detection range is greatly reduced.

SUMMARY OF THE INVENTION

An object of the invention is to overcome the shortcomings of the prior art and provides a solution for efficient downhole EM data transmission.

Another object of the present invention is to overcome the shortcomings of the prior art and provides a solution for downhole casing ranging.

In order to achieve the above objects, the present invention provides a drilling auxiliary system, which establishes one or more links among multiple wells or among different branches of the same well.

Wherein said drilling auxiliary system establishes one or more electrical connections among multiple wells.

Wherein said electrical connections are conductive wire and/or circuit connection.

Wherein said drilling auxiliary system establishes a link between a drilling well and an existing well for high-efficiency data transmission.

Wherein by establishing a link between a currently drilling well and an existing well, said drilling auxiliary system implements casing detection of the existing well.

Wherein said casing detection of the other well is to detect one of the casing's distance, orientation and trend, or any two of them, or all of them.

Wherein by establishing a link between a currently drilling well and an existing well, said drilling auxiliary system implements data transmission and casing detection of existing well.

Wherein by establishing a link between different branches of the same well, said drilling auxiliary system improves the efficiency of the data transmission from downhole to ground surface or drilling platform.

Wherein by establishing a link between different branches of the same well, said drilling auxiliary system helps the currently drilling branch to implement casing detection of existing branches.

Wherein said casing detection of existing branch is to detect one of the branch casing's distance, orientation and trend, or any two of them, or all of them.

Wherein by establishing a link between different branches of the same well, said drilling auxiliary system improves the efficiency of the data transmission from downhole to ground surface or drilling platform, and simultaneously helps a currently drilling branch to implement casing detection of existing branch.

Wherein said casing detection of existing branch is to detect one of the casing's distance, orientation and trend, or any two of them, or all of them.

Wherein said electrical connection is a circuit connection, the circuit for the electrical connection comprises one or more power supplies to enhance the current or voltage.

Wherein said power source is a current power source or voltage power source.

Wherein the frequency of said power source is any frequency from DC to low frequency then to high frequency.

Wherein said electrical connection is a circuit connection, the circuit for the electrical connection comprises a current amplifier or voltage amplifier to enhance the current or voltage.

Wherein said drilling auxiliary system further comprises a signal receiver for receiving the signal of the loop formed between the currently drilling well and the existing well.

Wherein said signal receiver is placed on ground surface or drilling platform, or is connected into the circuit between wells; or is inserted into the loop formed by the currently drilling well and the existing well, or is placed at any position connected or close to the loop, or any position around of the wells.

Wherein said signal receiver is connected into the existing circuit in series or parallel, or placed near the existing circuit.

Wherein the signal detected by said signal receiver is current, voltage, electric field, magnetic field or other electrical signals.

Wherein said drilling auxiliary system further comprises a transmitting device, wherein the downhole measurement signal is loaded into voltage, current, electric field or magnetic field generated by said transmitting device, and transmitted to said signal receiver by the loop formed between the currently drilling well and the existing well.

Wherein said transmitting device is a power source.

Wherein said power source is a power source from low frequency to high frequency or a DC power source.

Wherein said power source is located in the loop which is formed between the currently drilling well and the existing wells or between different branches of the same well.

Wherein said power source is located in the downhole.

Wherein said well is an oil-based mud well, wherein said transmitting device is located on the ground surface or drilling platform or is connected into the circuit between the drilling wells, with a signal loading device in the downhole.

Wherein when there are multiple existing wells around the currently drilling well, separately or simultaneously establishing the links between the currently drilling well and those existing wells.

Wherein said drilling auxiliary system further comprises a casing detection device mounted in the downhole.

Wherein said casing detection device implements the casing ranging according to the signal of the loop constituted of the currently drilling well, the existing well, and the formation.

Wherein the signal detected by said casing detection device includes current, voltage, electric field, magnetic field or other electrical signals.

Wherein said casing detection device is mounted on an insulation ring or a drill pipe above or below a downhole transmitting device.

Wherein said transmitting device is a power source.

Wherein said power source is a DC power source or a power source from low frequency to high frequency.

Wherein said power source is connected into the loop between the currently drilling well and the existing wells or between different branches of the same well.

Wherein said power source is located in the downhole.

Wherein said well is an oil-based mud well, and said transmitting device is located on the surface or drilling platform, or is connected into the circuit between the drilling wells.

The present invention further provides a detection method basing on said drilling auxiliary system, wherein when there are multiple existing wells around the currently drilling well, establishing a link separately between the currently drilling well and each of those existing wells;

For any existing well thereof, basing on the link established between the currently drilling well and the existing well, using said casing detection device to detect the casing of the existing well.

The present invention further provides another detection method basing on the drilling auxiliary system, wherein when there are multiple existing wells around the currently drilling well, first selecting an existing well and establishing a link between the selected existing well and the currently drilling well, and using said casing detecting device to detect the casing of the selected existing well; Then each time selecting an existing well from the wells outside the group of the wells have been linked, and establishing a new link between the selected well and the wells have been linked; then based on the signals of the group of linked wells, deriving the azimuth, distance, and trend of the new selected well; and repeatedly performing such steps till the casings of all of the existing wells around the currently drilling well are detected.

Compared with the prior art, the invention has the following technical effects:

1. When the present invention is applied to the EM data transmission, it can significantly reduce unwanted electric energy consumption in the formation, thus effectively improve data transmission efficiency.

2. When the present invention is applied to the casing detection, it can achieve a large detection range and greatly simplify the complexity of the operation, thereby saving costs.

DETAILED DESCRIPTION OF THE PREFERRED EMBODIMENTS

The invention will be further described by description of embodiments with reference to the accompanying drawings.

Figure 1:
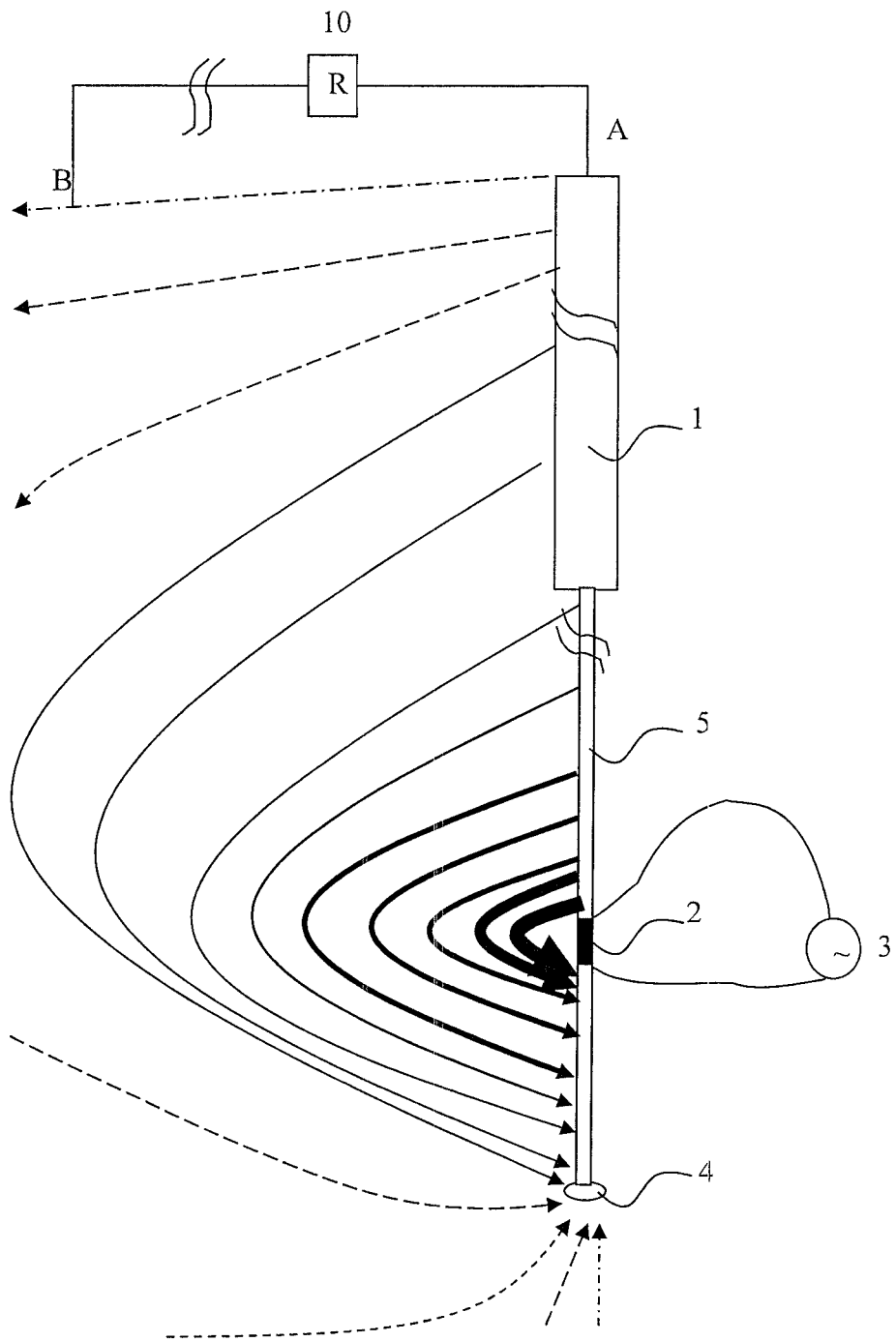
FIG. 1 shows a typical prior art of a downhole EM telemetry system.
Figure 2:
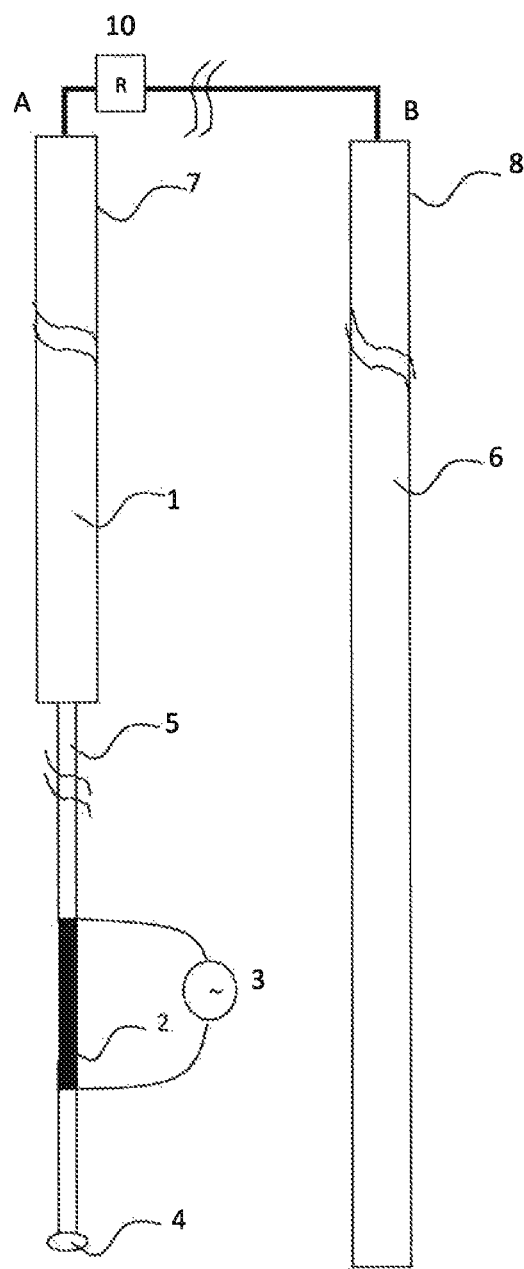
FIG. 2 shows a downhole EM data transmission system.

According to an embodiment of the present invention, FIG. 2 shows a downhole EM data transmission system, which improves the efficiency of data transmission from downhole to surface (or drilling platform) by establishing a link between the wells being drilled and the already existing wells. In the currently drilling well 1, insulating ring 2 is set on the drill pipe 5.

Figure 3:
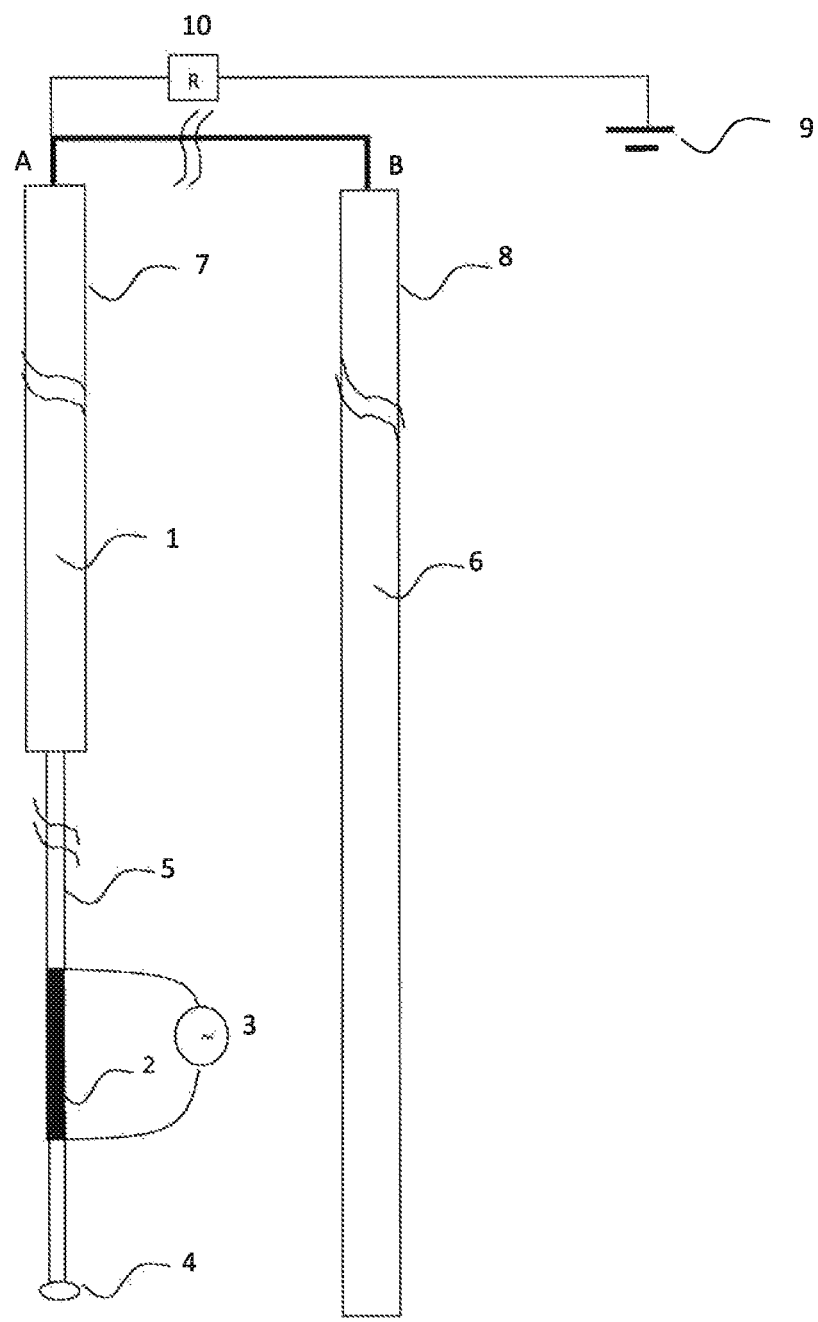
FIG. 3 shows another downhole EM data transmission system.

The electrical power source 3 is connected to the pipe 5 on the parts to both ends of the insulating ring 2. Well head terminal A of the casing 7 of the currently drilling well 1 is connected with the terminal B of the casing 8 of the already existing well 6 by a wire, and a signal receiver 10 is serially connected to the wire between two wells. Thus the electrical power source 3, the drilling pipe 5, the casing 7 (usually a conductor) of drilling well 1, the wire between the two wells, the casing 8 of existing well 6, and the formation around the two wells forms a large circuit loop, of which the formation energy dissipation is reduced. It can be used to improve the data transmission efficiency. In the FIG. 2, a signal receiver 10 is serially connected into the loop, so the data can be received by detecting the current in the wire. As an embodiment of the present invention, FIG. 3 shows another downhole EM data transmission system. The embodiment of FIG. 3 is similar to that of FIG. 2, and therefore the same reference numerals identify the same elements. The difference between the embodiments of FIG. 3 and FIG. 2 is that: one terminal of signal receiver 10 of FIG. 3 is connected with point A (not limited to point A) in the loop and the other terminal is placed at a point 9 far way, and then the data transmission will be achieved by measuring the voltage between the point A and the far point 9.

Figure 4:
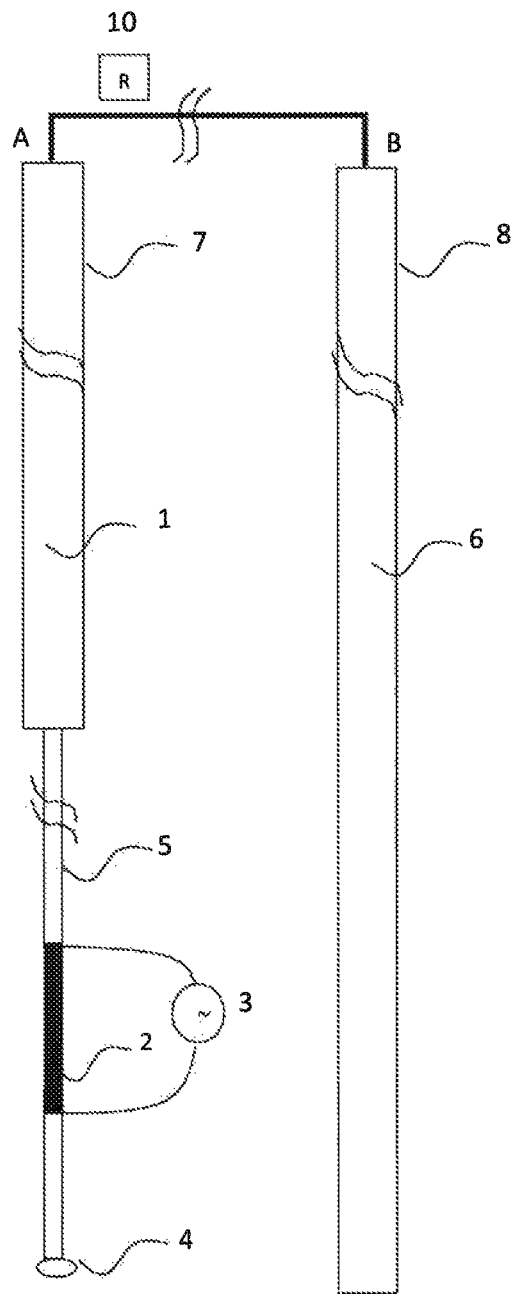
FIG. 4 shows a downhole EM data transmission system of still another embodiment of the present invention.

FIG. 4 shows a downhole EM data transmission system of still another embodiment of the present invention. The embodiment of FIG. 4 is similar to that of FIG. 2, and therefore the same reference numerals identify the same elements. The difference is that: signal receiver 10 is placed in the vicinity of a large loop formed by two wells and then the data transmission is conducted by measuring the EM field.

Figure 5:
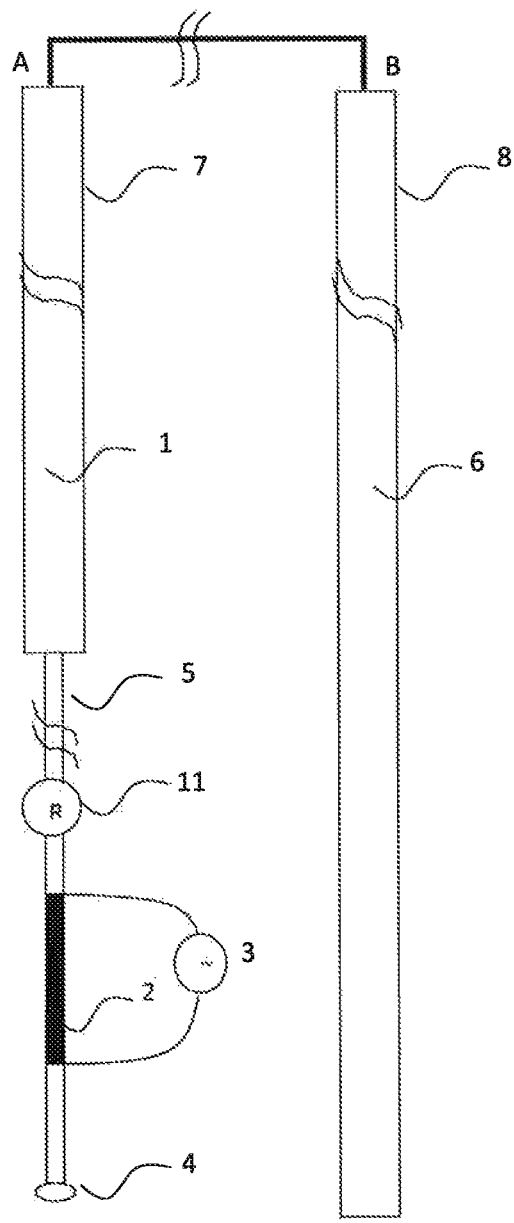
FIG. 5 shows a casing detection system of an embodiment of the present invention.

FIG. 5 shows a casing detection system of an embodiment of the present invention, which detects the position, orientation and trend of the existing well 6 from the drilling well 1 by establishing a link between two wells. In this embodiment, in the drilling well 1, the insulating ring 2 is set on the drilling pipe 5 and connects with power source 3. The casing 7 of currently drilling well 1 and the casing 8 of already existing well 6 are connected by a wire. Thus, the power source 3, the pipe 5 and the casing 7 of the drilling well, the wire connecting the two wells, the casing 8 of the existing well and the formation around the two wells forms a large loop, which can be used to detect the casings of existing wells.

Casing detection device 11 in FIG. 5 is placed on the drilling pipe above the transmission power source 3, and is used to detect the location of the casing 8 of the already existing well by measuring the magnetic field. Better to give an explanation, the casing detection device 11 of the present invention is not limited to the detection of the magnetic field, which is well understood by a person skilled in the art.

Figure 6:
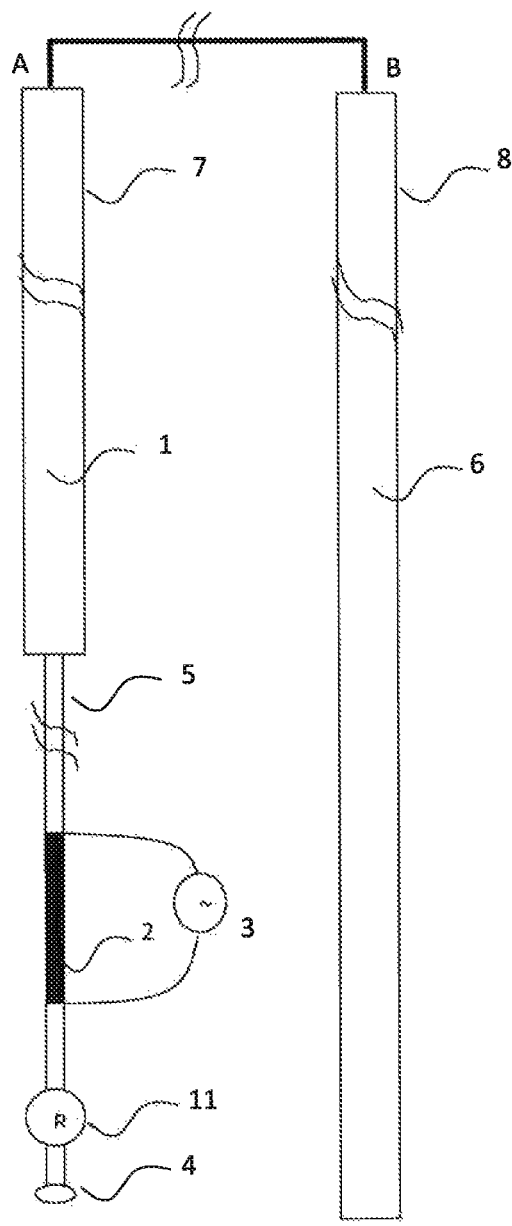
FIG. 6 shows a solution for casing detection of another embodiment.

FIG. 6 shows a solution for detecting the nearby existing wells of another embodiment. The embodiment of FIG. 6 is similar to that of FIG. 5, and therefore the same reference numerals identify the same elements. The difference between the embodiments of the FIG. 6 and the FIG. 5 is that: the casing detection device 11 is placed on the drilling pipe under the power source 3 in the FIG. 6, and the casing direction of the already existing wells may be conducted by measuring the electric field direction. Of course, the casing detection device 11 of the present invention is not limited to the detection of the electric field, which is well understood by a person skilled in the art.

Figure 7:
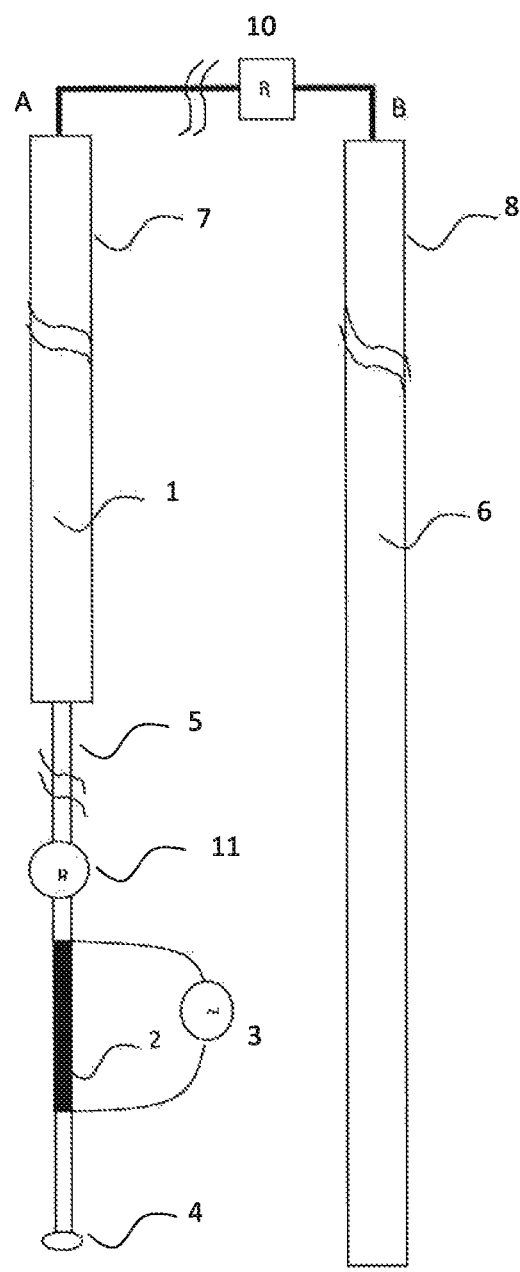
FIG. 7 shows a drilling auxiliary system which simultaneously implements downhole EM data transmission and casing detection in an embodiment of the present invention.

FIG. 7 shows an embodiment of a comprehensive logging system which simultaneously implements the downhole EM data transmission and the casing detection in an embodiment of the present invention. The embodiment simultaneously implements the data transmission and the casing detection by establishing a link between currently drilling well 1 and already existing well 6. In this embodiment, currently drilling well 1 and already existing well 6 are connected with each other by a wire, but in other embodiments, a complex circuitry or other connection methods may be used. Signal receiver 10 and casing detection device 11 are both placed in one set of system, and they simultaneously completes the tasks of the data transmission and the casing detection. The positions of signal receiver 10 and casing detection device 11 are not limited to the positions shown in FIG. 7, and the positions may be other positions of the logging system, such as the positions shown in FIGS. 3, 4, and 6.

Figure 8:
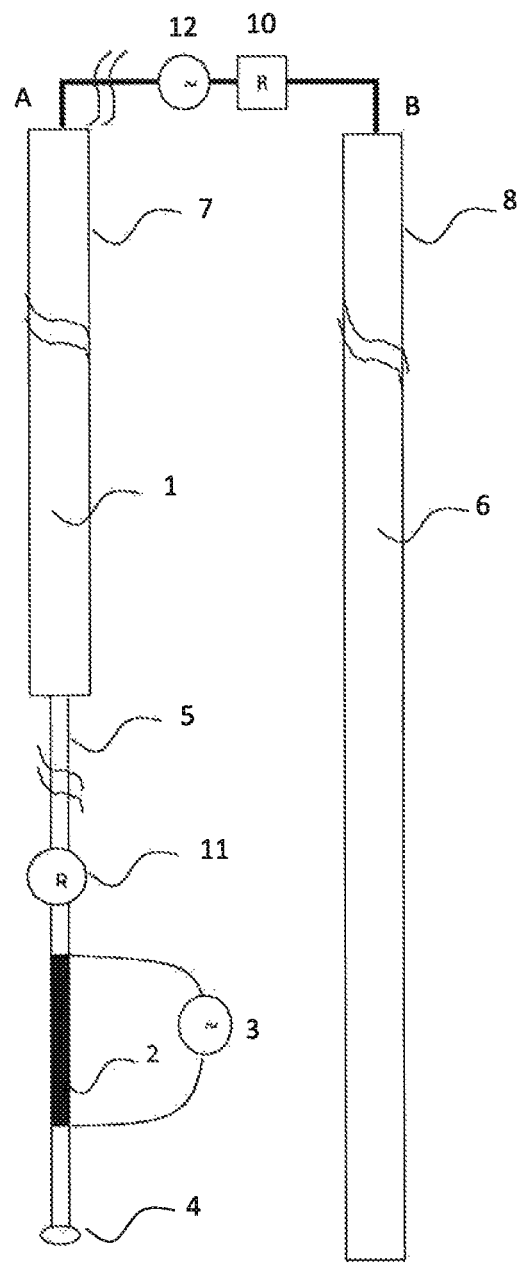
FIG. 8 shows a system which simultaneously implements downhole EM data transmission and casing detection in another embodiment of the present invention.

FIG. 8 shows another embodiment of a system which simultaneously implements the downhole EM data transmission and the casing detection of the present invention. The embodiment of FIG. 8 is similar to that of FIG. 7, therefore the same reference numerals identify the same elements, and will not be repeatedly described herein. The difference between FIG. 8 and FIG. 7 is that: the system of FIG. 8 adds an auxiliary power source 12. This auxiliary power source can help the system to achieve better data transmission as well as better casing detection. The auxiliary power source may also be separately added to the embodiments in FIG. 2, 3, 4, 5, 6, 7.

Figure 9:
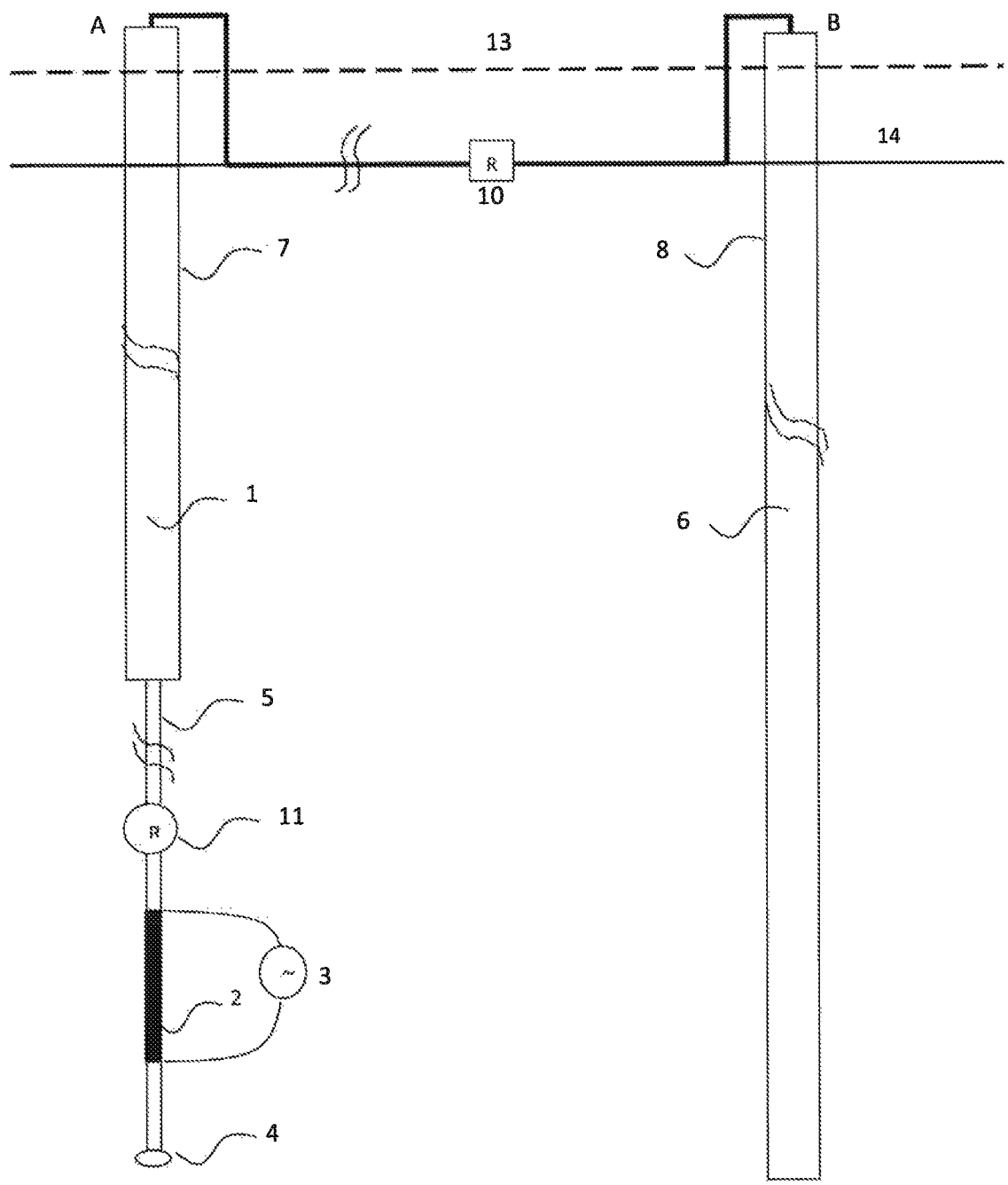
FIG. 9 shows a still another embodiment of a system which simultaneously implements downhole EM data transmission and casing detection in the present invention.

FIG. 9 shows a still another embodiment of a system, which simultaneously implements the downhole EM data transmission and the casing detection of the present invention. The embodiment of FIG. 9 is to establish a link between two offshore platforms through a circuit. The connection circuit for the link may be placed on the seabed, and the signal receiver 10 may be placed on the offshore platforms above the sea or placed on the seabed 14 as shown in FIG. 9.

Figure 10:
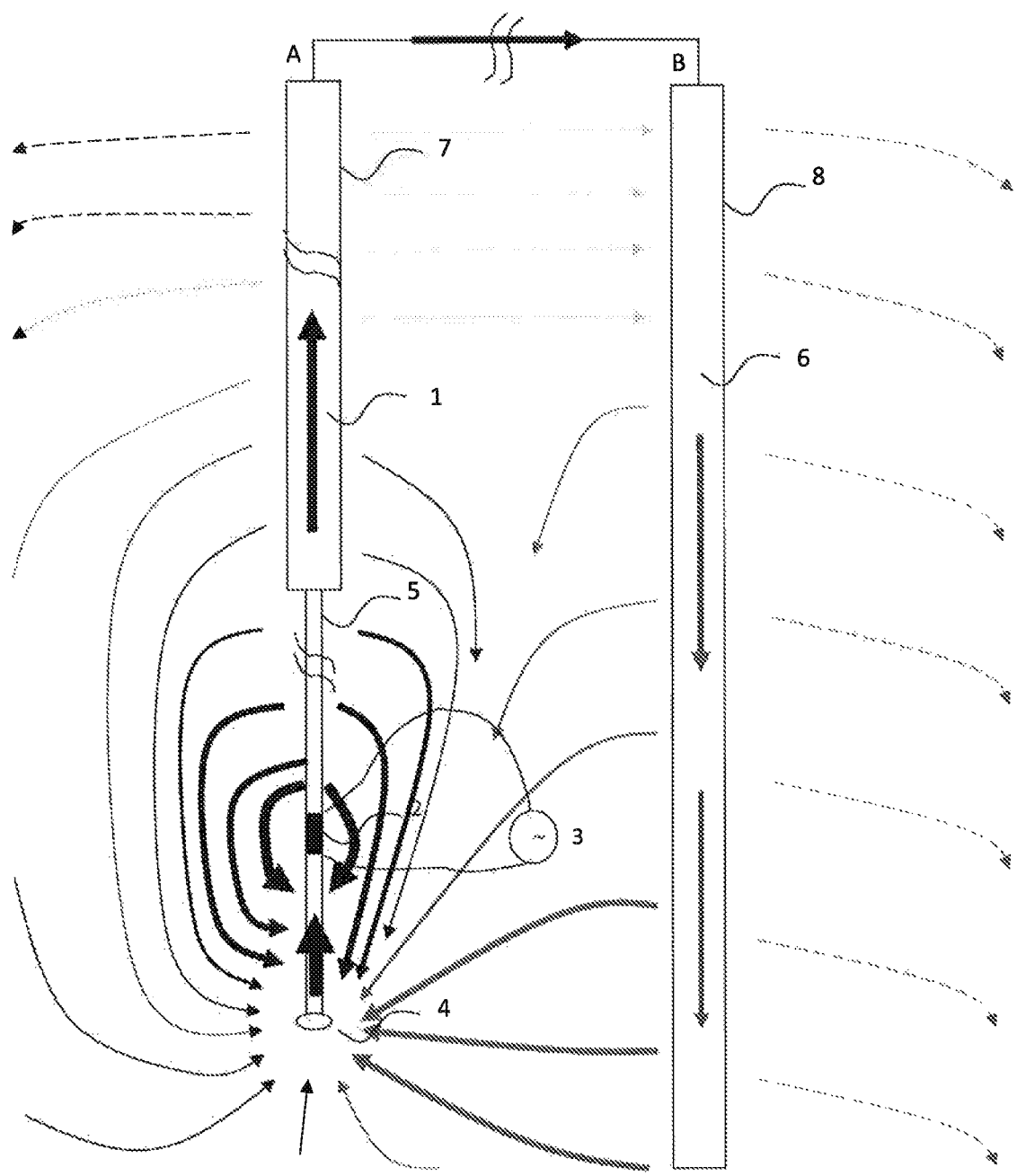
FIG. 10 shows the electric current distribution of the present invention. In this figure, for simplicity, the circuit connection between the drilling well and the existing well is a simple wire connection.

FIG. 10 shows an electric current distribution diagram of an example of the present invention. In the figure, for simplicity, the circuit between the currently drilling well and the already existing well is a simple wire. In fact, it may be a complex circuit to enhance the frequency of the downhole transmission power source, and/or increase the current intensity in the formation of the loop, thereby obtaining better signal transmission and measurement effects. If there are multiple wells surrounding the currently drilling well, they may be connected together simultaneously or by time-sharing to obtain better results. The power source shown in the figure may be a DC power source or an AC power source from low frequency to high frequency. In fact, the electric current in the FIG. 9 may be treated as two separate loops. The first loop is formed by the current out flowing from the upper terminal of the transmission power source, then passing through the drilling pipe, the surface wire, the casing of the existing wells, the formation and the drilling pipe below the insulated ring, and finally returning to the transmission power source; the second loop is formed by the current out flowing from the upper terminal of the transmission power source, then passing through the drilling pipe, the formation and the drilling pipe below the insulated ring, and finally returning to the transmission power source. Since the power of the first loop is mainly consumed in the formation between the downhole casing of the existing well and the drill pipe (and drill bit) below the insulated ring. When the distance is not far between the existing well and the currently drilling well, the current in this loop is quite strong. Since most of this current flows through the connection wire between the currently drilling well and the existing well, so MWD data loaded on downhole transmission power source may be received by measuring current, voltage or EM field on the surface, so as to achieve signal transmission effect. Similarly, since the first loop current is relatively strong, it is possible to apply a relatively high frequency, thereby increasing the transmission efficiency. Compared with the traditional solution, its efficiency can be increased dozens of times.

As shown in FIG. 10, the electric current in the vicinity of the surface, which flows from the drilling well through formation to the existing well, is very weak, so it is represented by grey arrows. On the contrary, the current flowing through the connection wire to the existing well is much stronger, and it is represented by dark bold arrows. When the current flows to the existing well, the current will flow downwards along the casing of the existing well, then pass through the formation to the drill pipe below the insulated ring of the currently drilling well, and finally return back to the power source. Obviously, quite a part of current flows through the casing of existing well, which generates secondary EM field, Receiving device on the drill pipe can detect the EM field generated by the casing current, so as to determine the distance and azimuth of the existing wells.

Figure 11:
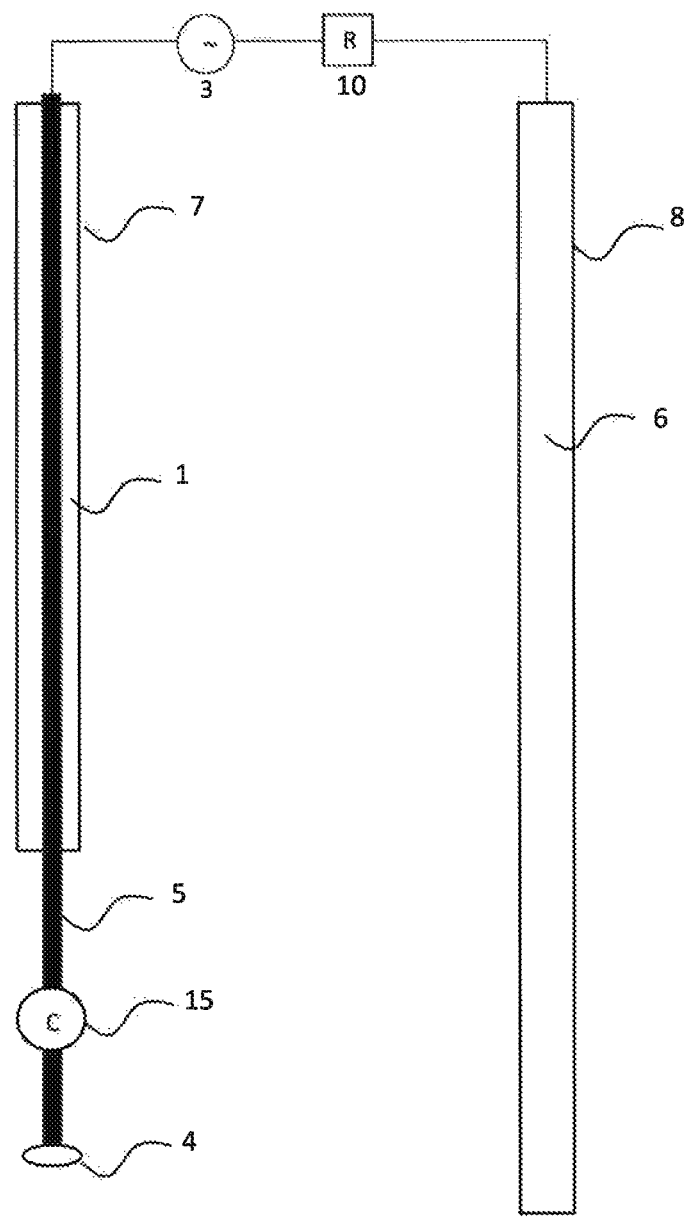
FIG. 11 shows an embodiment of downhole EM data transmission system applied to oil-based mud drilling in the present invention.

FIG. 11 shows an embodiment of downhole EM data transmission system suited for oil-based mud drilling. Because of the large resistivity of oil-based mud, most of the current flows through the casing 7 of the drilling well, the connection wire, the casing 8 of the existing well, the formation, the drill bit 4 of the drilling well, and finally goes back to the bottom side of source through the pipe 5, so as to form a large loop. As shown in FIG. 11, the source 3 may be placed on the surface. Thus a faster downhole data transmission rate can be achieved by increasing the current and voltage. Downhole data can be loaded by a signal loading device 15 mounted on the drill pipe 5, and the data is received on the surface by the signal receiver 10. The signal loading device 15 may be a current or a voltage controller.

Figure 12:
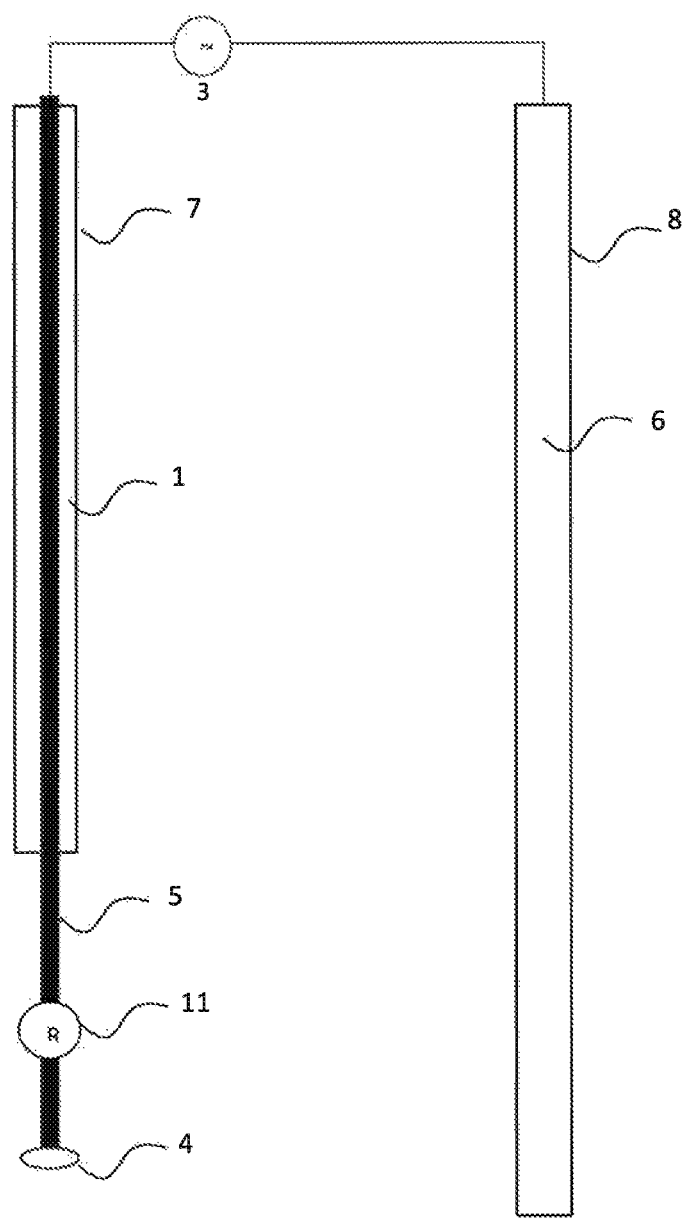
FIG. 12 shows another embodiment of downhole EM data transmission system applied to oil-based mud drilling in the present invention.

FIG. 12 shows another embodiment of downhole EM data transmission system suited for oil-based mud drilling. Because of the large oil-based mud resistivity, most of the current flows through the casing 7 of currently drilling well, drill pipe 5 and drill bit 4, the formation, the casing 8 of existing well, then flows upwards along the casing 8 of the existing well to the surface, so as to form a large loop. This source 3 can be placed on/near the surface. As Shown in FIG. 12, casing detection device 11 is mounted on drill pipe 5. A more effective distance of casing detection can be achieved by increasing the current (or voltage) of power source 3.

Figure 13:
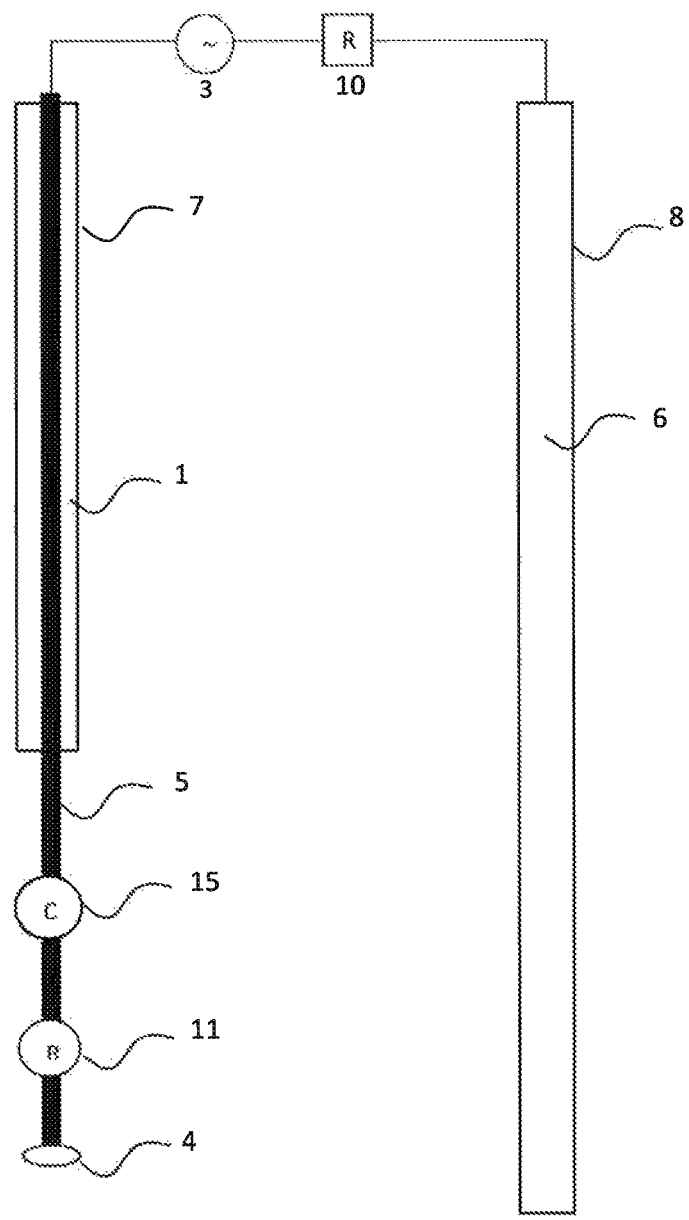
FIG. 13 shows an embodiment of the drilling auxiliary system for oil-based mud drilling, which simultaneously implements downhole EM data transmission and casing detection in the present invention.

FIG. 13 shows an embodiment of a comprehensive logging system which suits for oil-based mud drilling and simultaneously implements the downhole EM data transmission and the casing detection. The embodiment of FIG. 13 is similar to that of FIG. 11, therefore the same reference numerals identify the same elements, and will not be repeatedly described herein. The difference between FIG. 13 and FIG. 11 is that: a casing detection device 11 is further mounted on drill pipe 5 in FIG. 13. The power source 3 can be placed near the surface in the system of FIG. 13, thus by increasing the current (or voltage) of the source, a faster data transmission rate and a farther effective distance of casing detection can both be achieved.

Figure 14:
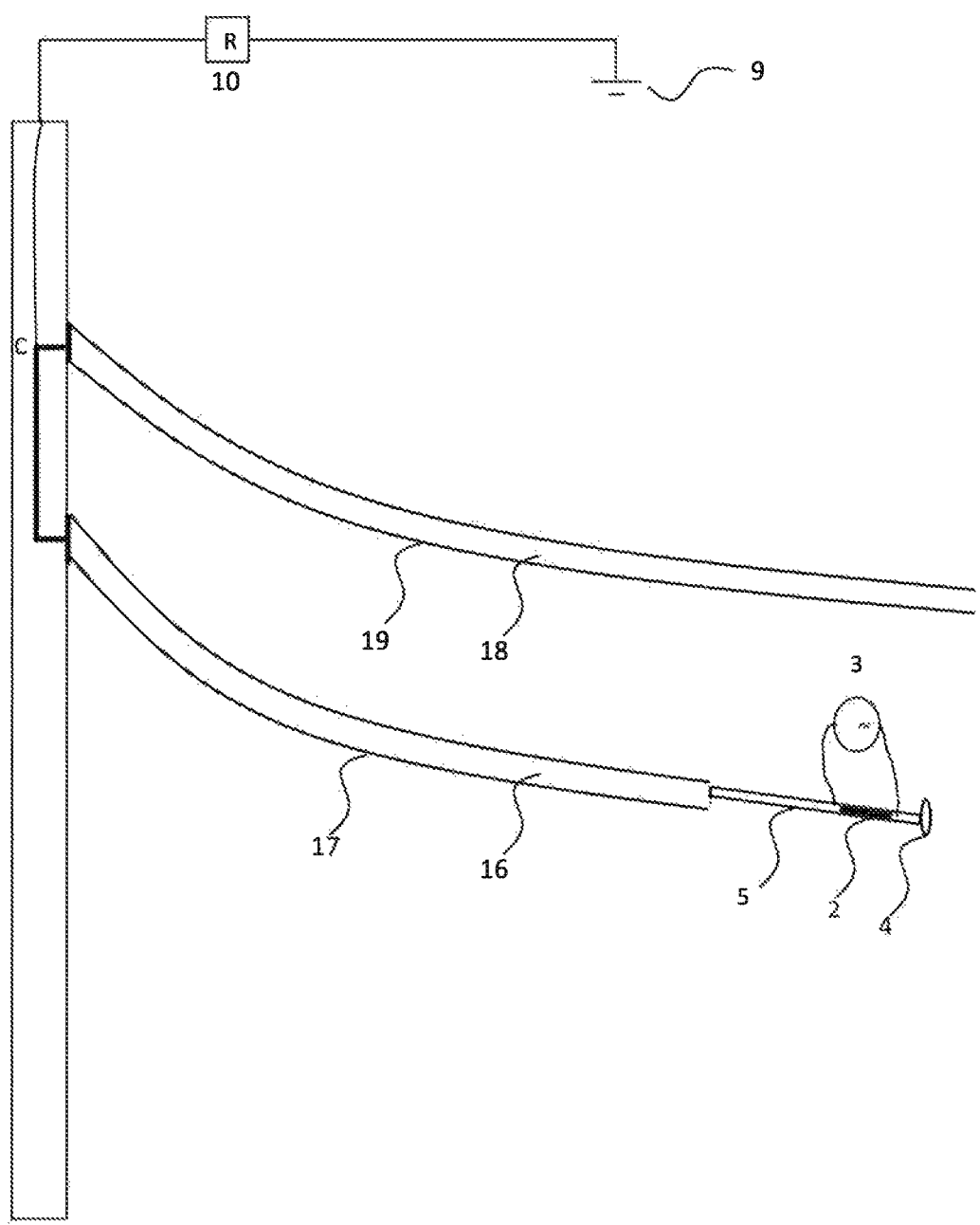
FIG. 14 shows an embodiment of the present invention applied to downhole data transmission in the wells with multiple downhole branches.

FIG. 14 shows an embodiment suited for downhole data transmission in the well with downhole branches. The system establishes a link between different branches of one well, thereby effectively improving the downhole data transmission efficiency. Regarding a currently drilling branch of a well as a special currently drilling well, and an already existing branch of the same well as a special already existing well, the principle of establishing a link between different branches of one well is the same with that of establishing a link between different wells. As shown in the FIG. 14, signal receiver 10 of the system is placed on the surface, wherein one terminal of the signal receiver 10 is connected with the connection (such as wires) between different branches by a wire, and the other terminal of the signal receiver 10 is connected to the far ground terminal 9. Signal receiver 10 may receive data by detecting the voltage from the connection between different branches (such as wires) to the infinitely far ground terminal 9. Thus a large loop is formed by the transmission power source 3, the drill pipe 5 of the currently drilling branch 16, the casing 17 (usually conductor) of the currently drilling branch 16, the wire between the two downhole branches, the branch casing 19 of the already existing downhole branch 18 and the formation around the two downhole branches, wherein the energy dissipation of the loop in the formation is relatively small. By connecting signal receiver 10 to the wire between the two downhole branches, the data from downhole drilling branch can be efficiently received.

Figure 15:
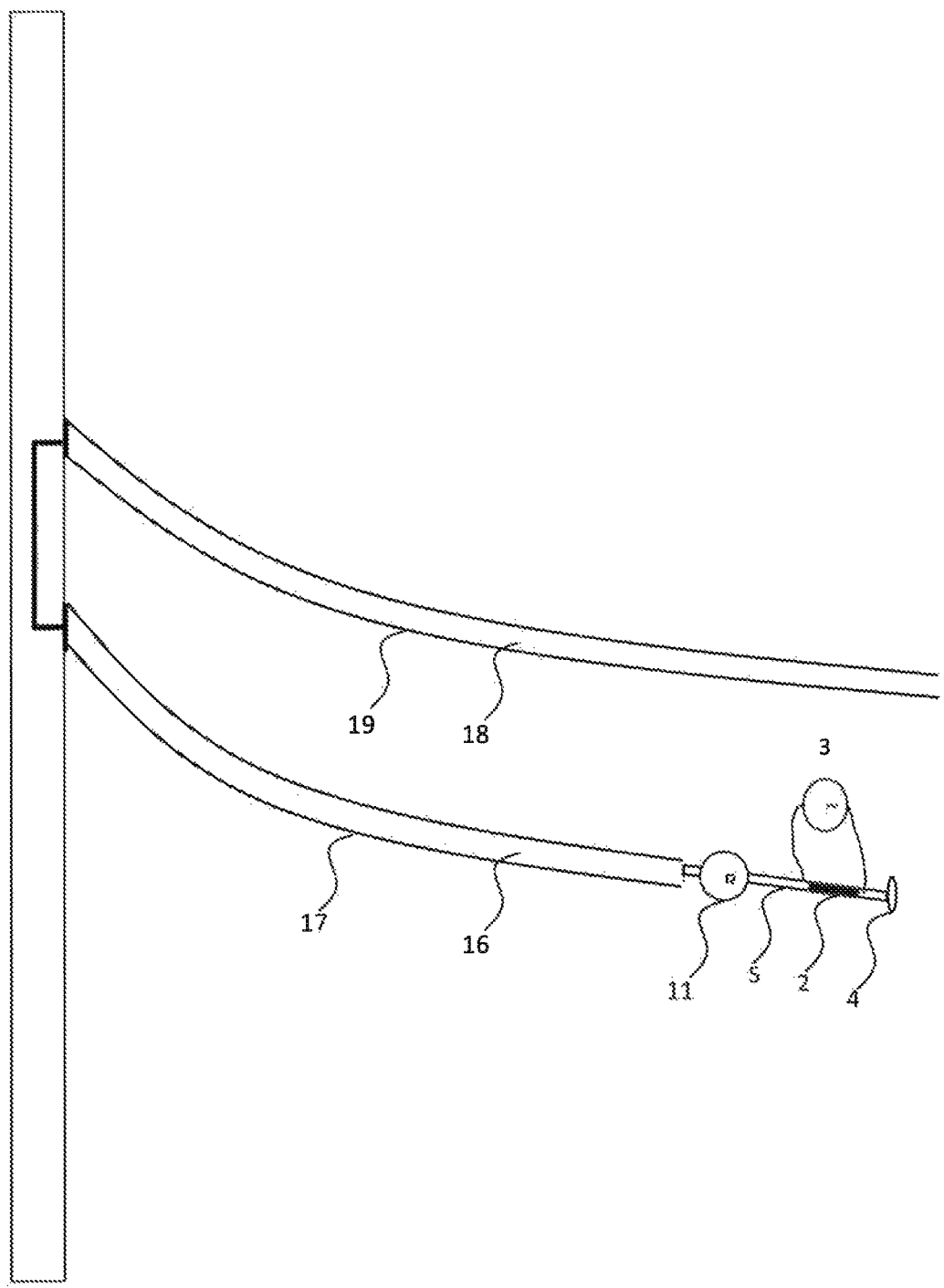
FIG. 15 shows an embodiment of the present invention applied to downhole casing detection in the wells with multiple downhole branches.

FIG. 15 shows an embodiment of the present invention suited for downhole casing detection in a well with multiple downhole branches. The casing detection system establishes a link between different branches of one well, thereby effectively simplifying the complexity of casing detection. The embodiment of FIG. 15 is similar to that of FIG. 14, therefore the same reference numerals identify the same elements, and will not be repeatedly described herein. The difference is merely that: FIG. 15 does not contain the receiving device on the surface for downhole data transmission, but adds a detecting device on the currently drilling branch to detect already existing branches.

Figure 16:
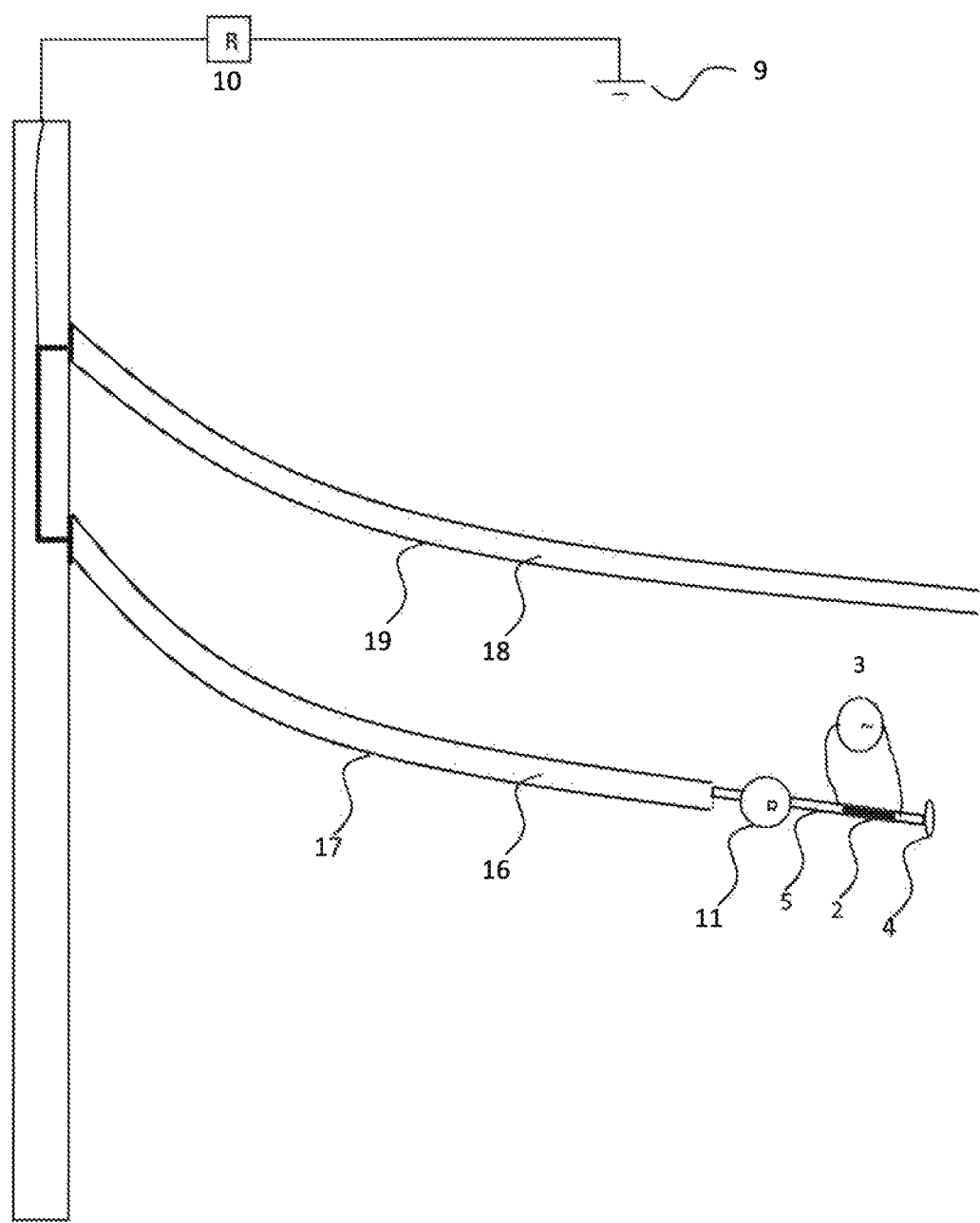
FIG. 16 shows an embodiment of the present invention applied to the wells with multiple downhole branches which simultaneously implements data transmission and casing detection.

FIG. 16 shows an embodiment of the present invention suited for comprehensive system with downhole branches which simultaneously implements the downhole data transmission and the casing detection. The system establishes a link between different branches of one well, and thereby simultaneously achieving the effects of downhole data transmission and casing detection for the existing branches. The embodiment of FIG. 16 is similar to that of FIG. 14, therefore the same reference numerals identify the same elements, and will not be repeatedly described herein. The difference is merely that: a casing detection device is mounted on the drill pipe of the currently drilling branch to detect the existing branch.

Finally, it should be noted that the above embodiments are merely to describe the technical solutions of the invention, not to limit the technical methods. This invention in application can be extended to other modifications, variations, uses and embodiments, and therefore it is believed that all this modifications, variations, uses and embodiments are within the scope of the spirit and teachings of the invention.

The invention claimed is:

1. A logging while drilling auxiliary system comprising:
   connection wires establishing circuit connection among multiple wells via at least two connection points, wherein the multiple wells comprise a currently drilling well and at least one existing well, one of the at least two connection points is at the terminal of a drilling pipe or casing for the currently drilling well, and one of the at least two connection points is at the terminal of casing for the at least one existing well;
   a transmitting device electrically connected to the drilling pipe, or the casing of the currently drilling well, or the casing of the at least one existing well, or the connection wires, and configured to supply electric current to the drilling pipe, the casing of the currently drilling well, and the casing of the at least one existing well, wherein the connection wires form a current loop in combination with the transmitting device, the drilling pipe, the casing of the currently drilling well, the casing of the at least one existing well, and formation between the currently drilling well and at least one existing well; and
   a receiver connected to the current loop and receiving data by detecting an electric signal of the current loop, wherein the electric signal is selected from the group consisting of current, voltage, EM field, and combinations thereof.

2. The logging while drilling auxiliary system of claim 1, wherein the transmitting device is located at any position in the current loop.

3. The logging while drilling auxiliary system of claim 1, wherein the transmitting device is a power source.

4. The logging while drilling auxiliary system of claim 3, wherein the power source is a DC power source or an AC power source from low frequency to high frequency.

5. The logging while drilling auxiliary system of claim 1, wherein the current loop comprises one or more power sources.

6. The logging while drilling auxiliary system of claim 1, wherein the current loop further comprises a current amplifier or a voltage amplifier.

7. The logging while drilling auxiliary system according to claim 1, wherein the system further comprises a signal receiver.

8. The logging while drilling auxiliary system of claim 7, wherein the signal receiver is connected to an existing circuit in series or parallel, or placed near the existing circuit.

9. The logging while drilling auxiliary system of claim 7, wherein the signal receiver receives a signal selected from the group consisting of current, voltage, electric field, magnetic field and other electrical signal.

10. The logging while drilling auxiliary device of claim 1, further comprising a casing detection device mounted in a downhole.

11. The logging while drilling auxiliary system of claim 10, wherein the casing detection device detects a signal selected from the group consisting of electric current, voltage, electric field, magnetic field and other electrical signal.

* * * * *